United States Patent [19]
McKenzie

[11] 3,974,925
[45] Aug. 17, 1976

[54] LOADER AND TREE REMOVER

[76] Inventor: Girard J. McKenzie, 1486 Hawthorne Drive, Sebring, Fla. 33870

[22] Filed: May 29, 1975

[21] Appl. No.: 581,900

[52] U.S. Cl. .......................... 214/147 G; 144/34 A; 144/309 AC
[51] Int. Cl.² ......................................... B66C 3/04
[58] Field of Search ........ 47/58; 144/309 AC, 34 A; 294/104; 214/147 R, 147 G, 3, 138 R

[56] References Cited
UNITED STATES PATENTS

| | | | |
|---|---|---|---|
| 2,958,434 | 11/1960 | Wagner | 214/147 R X |
| 3,422,975 | 1/1969 | Crisp | 214/147 R |
| 3,826,388 | 7/1974 | Oldenburg et al. | 214/140 |

FOREIGN PATENTS OR APPLICATIONS

| | | | |
|---|---|---|---|
| 704,088 | 2/1965 | Canada | 214/147 R |

*Primary Examiner*—Frank E. Werner
*Attorney, Agent, or Firm*—George B. Oujevolk

[57] ABSTRACT

The present invention contemplates a tree remover which is mounted at the front of an agricultural vehicle, which has a front plate with side walls. Extending forwards is a boom which is pivoted to the side walls. At the forward end of the boom is a fork assembly having upper and lower jaws and teeth. Associated with the boom and fork assembly are three jacks. A first jack affixed to the front plate raises and lowers the boom. The second jack, disposed for cylinder and piston movement parallel to the boom, is attached at the front end thereof to a jaw plate which holds the lower jaw, and moves the fork assembly. The third jack moves the upper teeth with relationship to the lower teeth. The device is particularly useful in a citrus grove to dig the lower teeth under the roots of a tree and lift the tree vertically out of the ground, roots and all. The device can later be used to clear debris out of the grove paths with the tong-like operation of the fork assembly.

5 Claims, 8 Drawing Figures

LOADER AND TREE REMOVER

BACKGROUND OF THE INVENTION

The present invention relates to an apparatus for loading trees and for tree removal, and more particularly to an apparatus for clearing citrus groves.

BRIEF DESCRIPTION OF THE PROBLEM

In clearing citrus groves it is essential to have a machine that will get under the tree roots, grasp the tree and remove it, and afterwards clear up the debris. Although there are many rake-like machines, none, as far as I am aware, have ever been successful for use as a citrus tree loader or remover.

SUMMARY OF THE INVENTION

Generally speaking, the present invention contemplates a tree remover which is mounted at the front of an agricultural vehicle, which has a front plate with side walls. Extending forwards is a boom which is pivoted to the side walls. At the forward end of the boom is a fork assembly having upper and lower jaws and teeth. Associated with the boom and fork assembly are three jacks. A first jack affixed to the front plate raises and lowers the boom. The second jack, disposed for cylinder and piston movement parallel to the boom, is attached at the front end thereof to a jaw plate which holds the lower jaw, and moves the fork assembly. The third jack moves the upper teeth with relationship to the lower teeth. The device is particularly useful in a citrus grove to dig the lower teeth under the roots of a tree and lift the tree vertically out of the ground, roots and all. The device can later be used to clear debris out of the grove paths with the tong-like operation of the fork assembly.

The invention, as well as other objects and advantages thereof will become more readily apparent from the following detailed description, when taken together with the accompanying drawings, in which:

DETAILED DESCRIPTION

Figure 1:
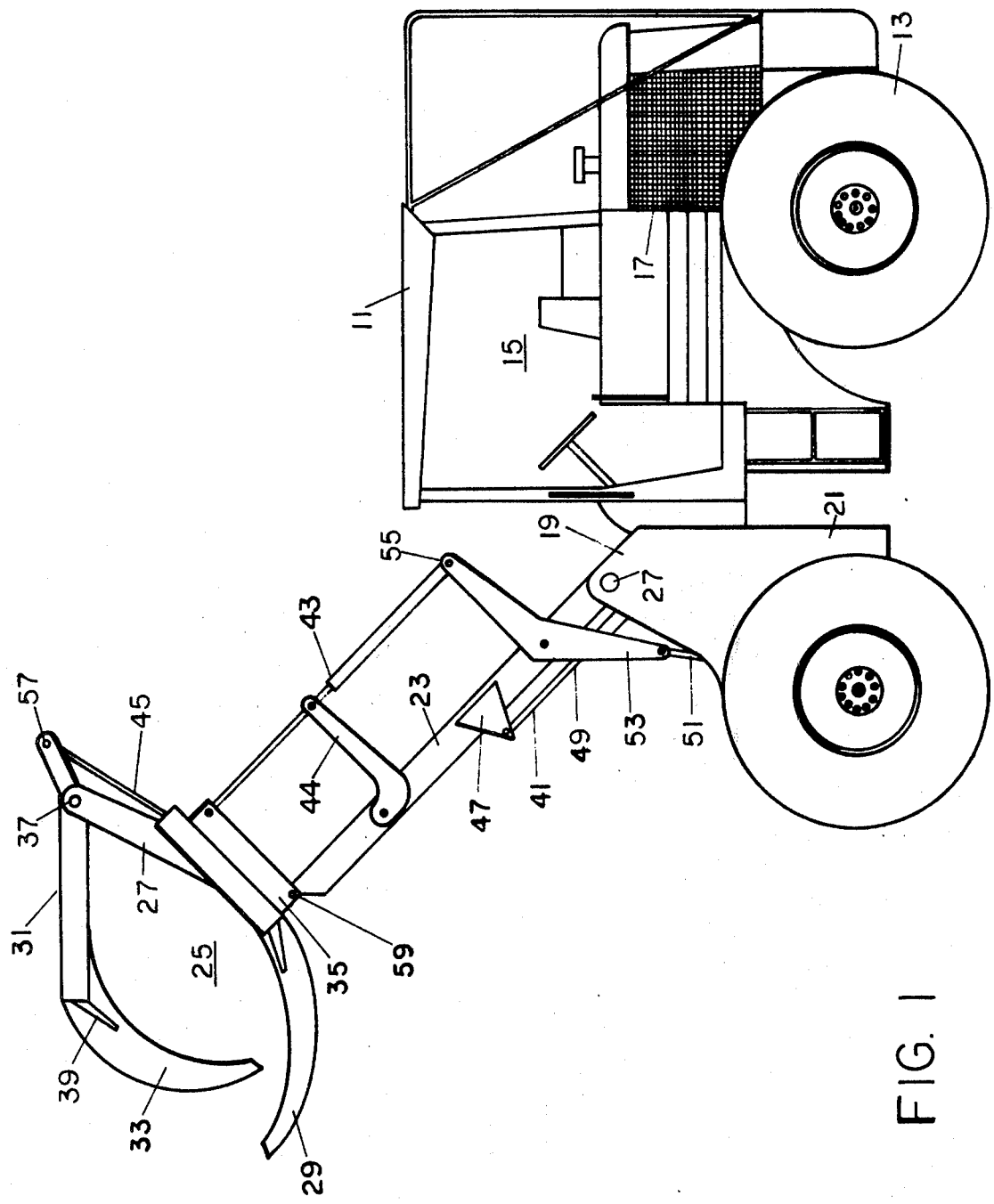
FIG. 1 is a longitudinal side view of the device herein contemplated, teeth closed.
Figure 2:
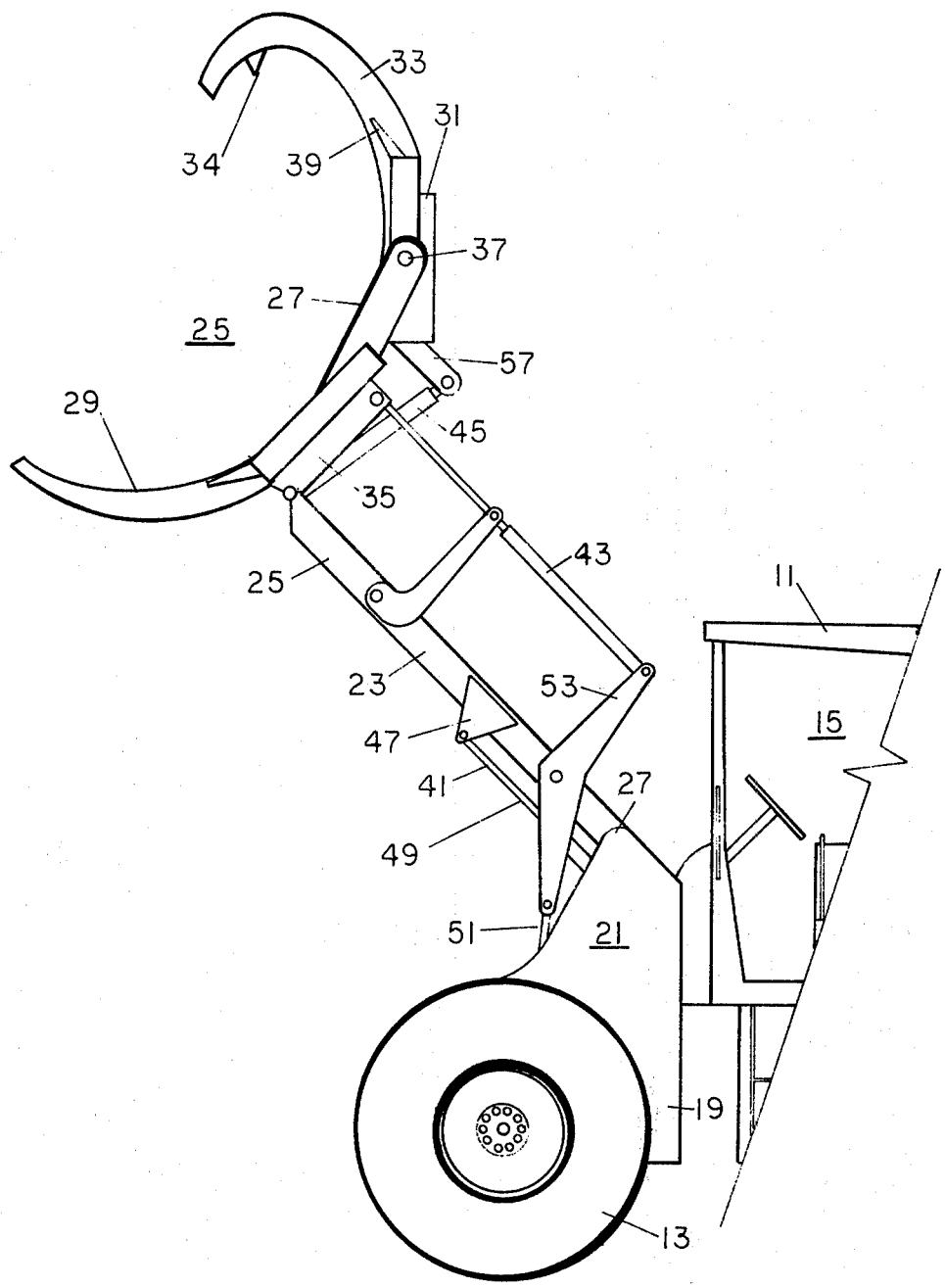
FIG. 2 shows the front end of the device in the up position, teeth open.
Figure 3:
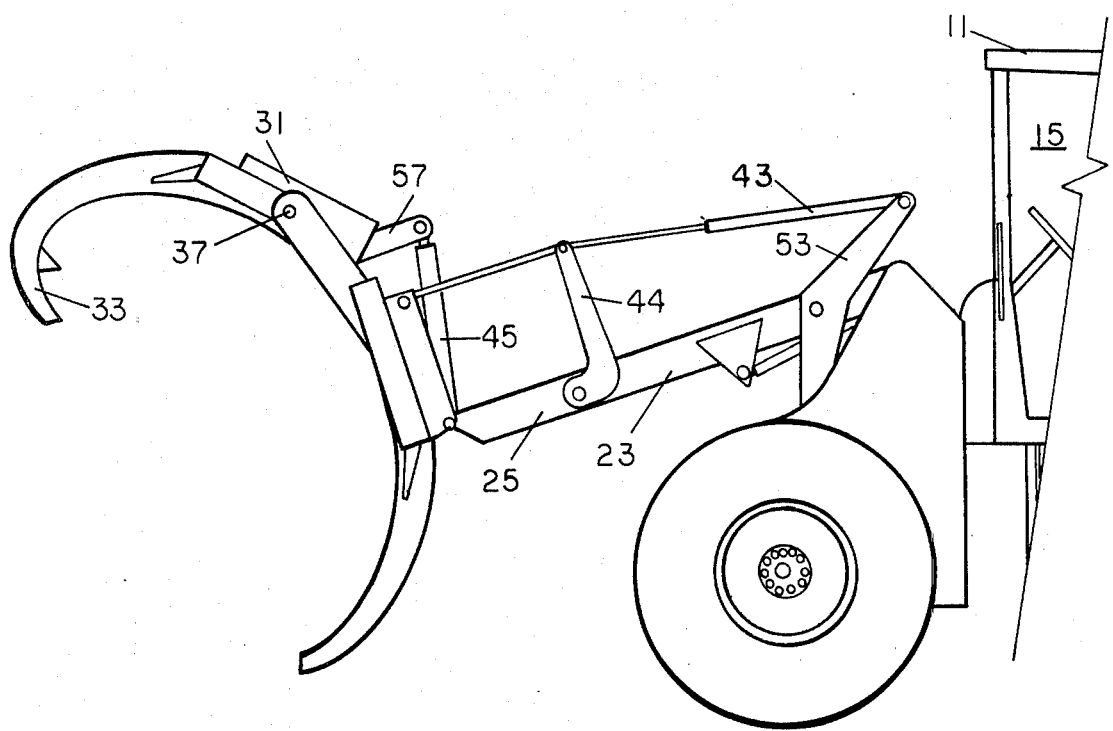
FIG. 3 shows the front end of the device in the down position, mouth down, teeth open.
Figure 4:
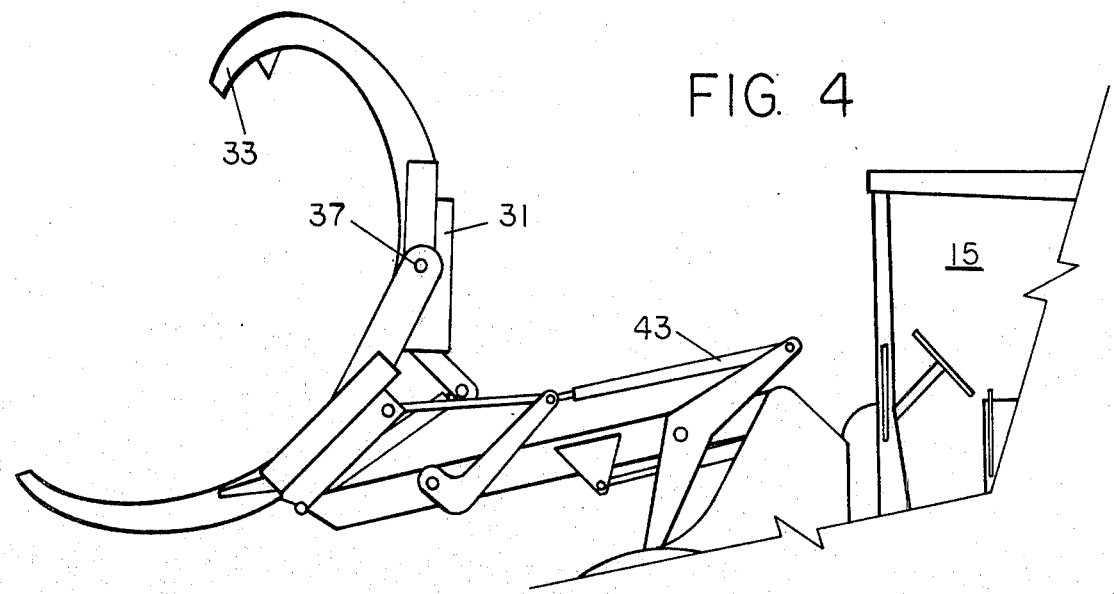
FIG. 4 shows the front end of the device in the down position, mouth up, teeth open.
Figure 5:
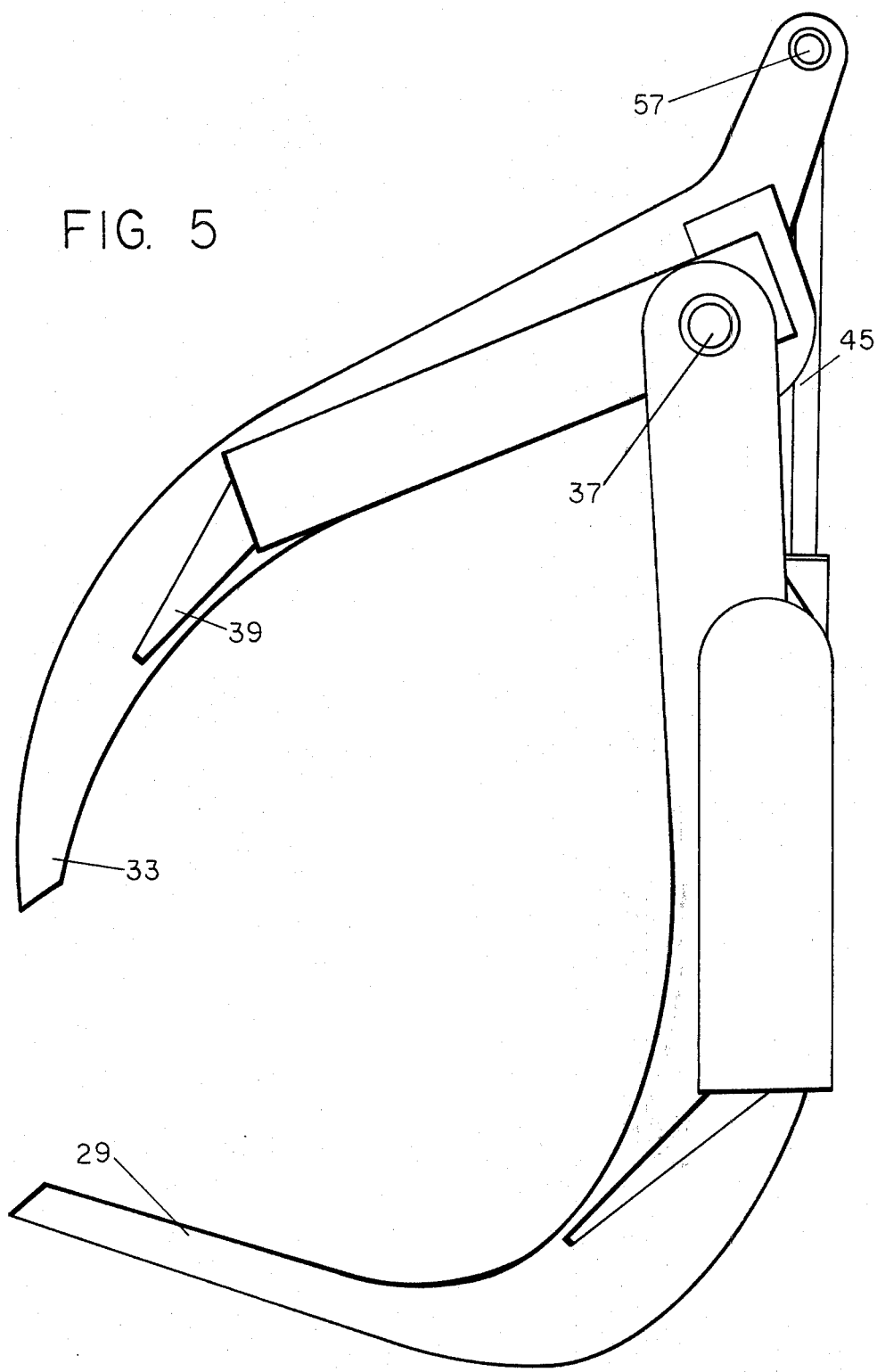
FIG. 5 illustrates a longitudinal side view of the device mouth down with the teeth in the closed position.
Figure 6:
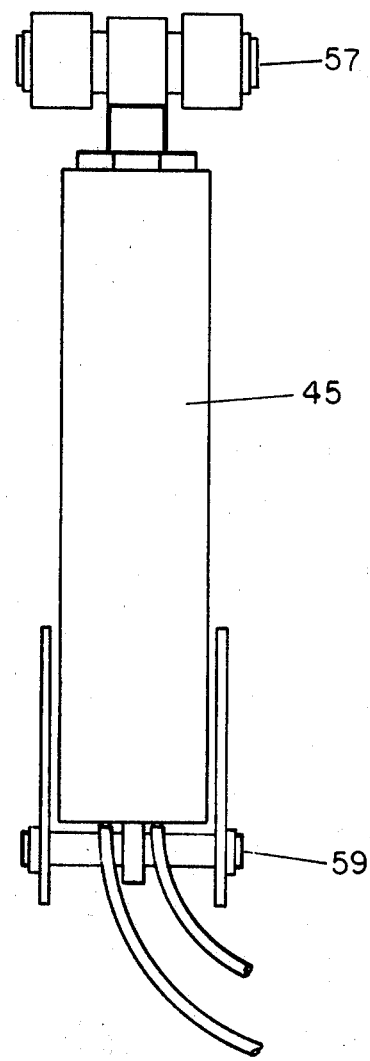
FIG. 6 shows the rear of the jack which operates the upper jaw and teeth.
Figure 7:
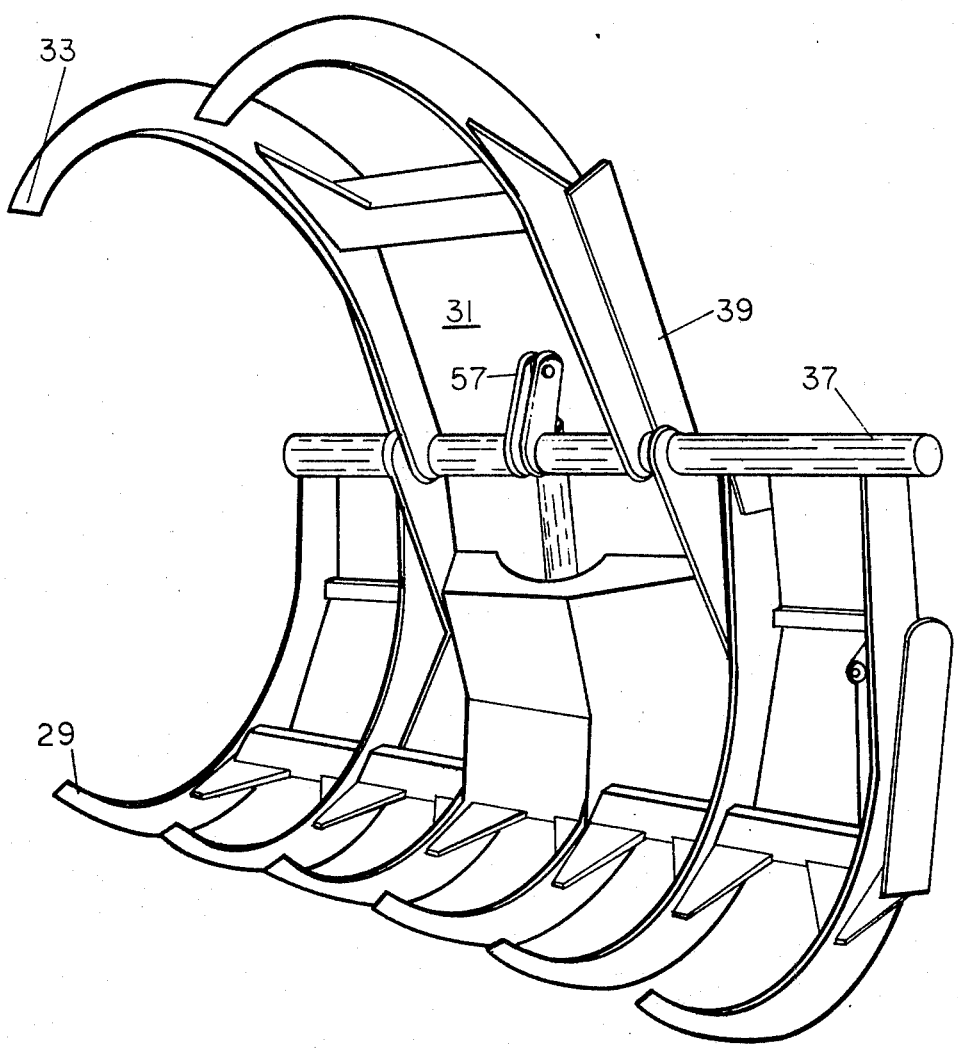
FIG. 7 depicts the fork assembly in perspective.
Figure 8:
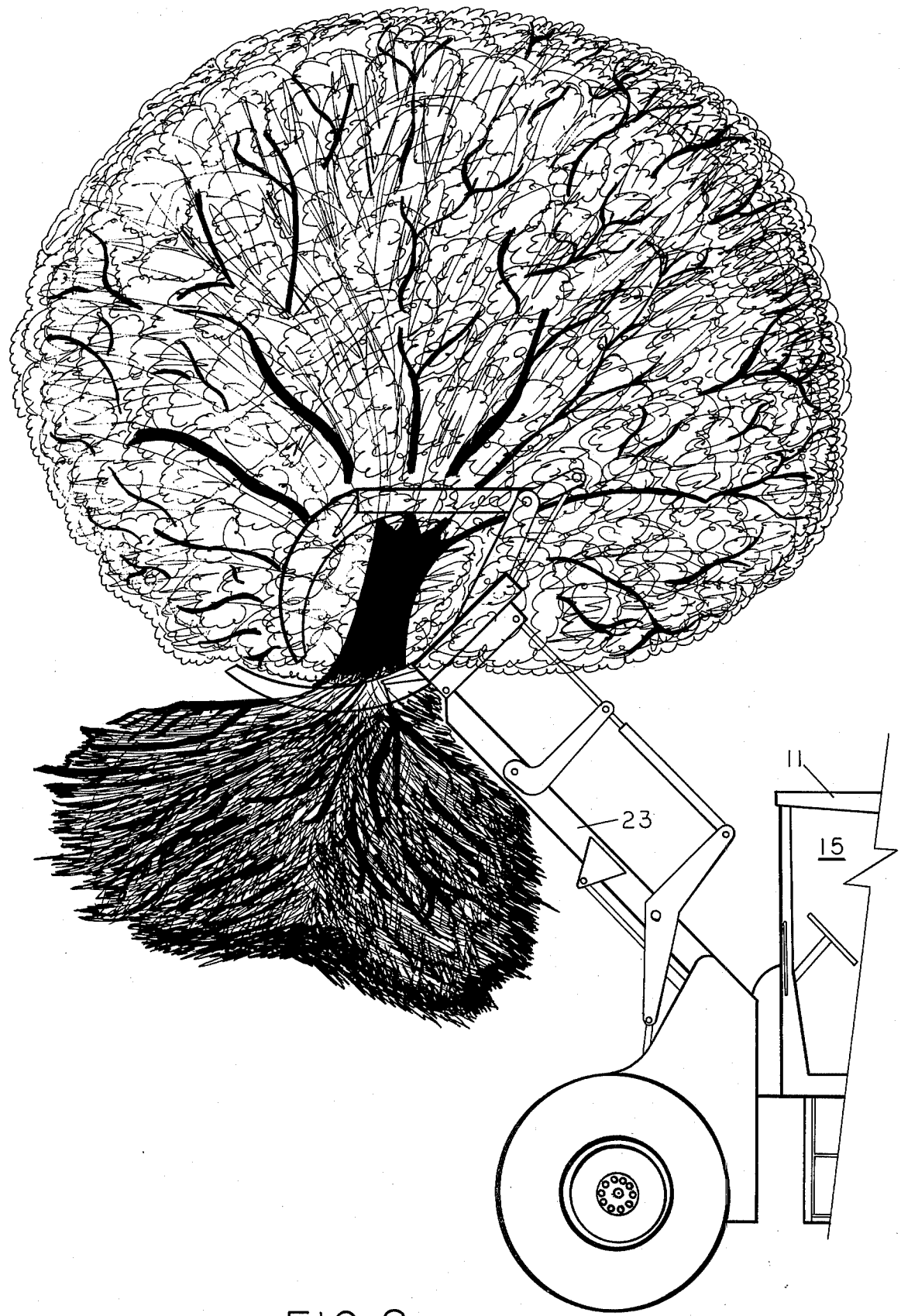
FIG. 8 is a perspective illustration of how the device lifts a tree by its roots.

Shown in the drawing is an agricultural vehicle 11 of the bulldozer type. This vehicle has the usual heavy duty wheels and tires 13, a cab 15 fairly high off the ground, and a motor 17 at the rear. The tree loader and removal arrangement will be found at the front of the vehicle and consists of the vehicle front plate 19 which extends across the front of the vehicle. This front plate is a tub-like shape having side walls 21 serving to support the other components at the front of the vehicle.

Pivotally mounted on both side walls 21 is a boom 23. This boom 23 has a pair of arms 25, one end 27 of each arm being pivotally mounted in the upper recess of each side wall 21. The boom extends outwards, i.e., in front of the vehicle for about 15 to 20 feet. Mounted at the end of the boom 23 is a fork assembly. Fork assembly 25 has a lower jaw 27 with lower teeth 29 and an upper jaw 31 with upper teeth 33. These upper and lower jaws have a width across the jaws, i.e., normal to the direction of travel of the vehicle of about six feet. If the jaws are too wide, the teeth will damage existing fruit trees during the travel of the vehicle. At the end of the boom 23 is a jaw plate 35 and the lower jaw 27 is affixed to the jaw plate. Thus, the lower jaw 27 and teeth 29 are meniscus or crescent shaped with the wider part of the meniscus or crescent held by the jaw plate 35. The lower and upper jaws 27, 31 are attached to a jaw anchor rod 37 which is a heavy rod disposed normal to the direction of travel of the vehicle. The anchor rod 37 passes through the inner ends of both jaws so that the jaws are pivoted thereto. There are six lower teeth 29 and two upper teeth 33. Generally the upper teeth 33 are arcuate in shape and designed to encircle a tree trunk in cooperation with the crescent shaped lower teeth 29. Each upper tooth 33 has a barbed grappler 34 to help grip a tree. The two upper teeth 33 are firmly held to the upper jaw 31 by an upper jaw reinforcement 39.

Movement of the boom, the entire fork assembly and the upper teeth is carried out by three sets of jacks. The first jack 41 raises and lowers the boom. The second jack 43 moves the lower jaw and the upper jaw in a curved travel path. The third jack 45 moves the upper jaw and teeth with relation to the lower jaw and teeth. The first jack 41 has a triangular pivot 47 affixed to the boom 25 with a focal point end below the boom. Attached to this focal point end is a piston rod 49 which extends parallel to the boom. Associated with first jack 41 is a boom jack 51 attached to a crank lever 53. Crank lever 53 is pivoted to both the boom 25 and the inner end 55 of second jack 43. The other end of jack 43 is supported by a pivoted support 44. The outward movement of the rods of the boom jack 51 and first jack 41 will raise the boom. The inward movement of these rods will lower the boom.

Crank lever 53 has one end coupled to the inner end of second jack 43. Second jack 43 includes a cylinder and piston rod which extends from just in front of the vehicle to a pivot position at the top of the jaw plate 35. The bottom of the plate is pivoted to the boom 25. Therefore as the piston rod of jack 43 moves forward the jaw plate 35 will pivot forward and the teeth 29 will move pivotally backwards or downwards. If the jack 43 causes its piston rod to move inwards in the cylinder the jaw plate 35 will pivot backwards and the teeth will move upwards and forwards. Upper jaw 31 is pivotally mounted on anchor rod 37, and has a tail piece 57 extending back of the pivot point on anchor rod 37. The third jack 45 is mounted behind the jaw plate 35 and pivotally affixed to the vicinity of the jaw plate at point 59, and extends to the rear of tail piece 57. When the piston rod of the third jack 45 moves up the upper jaw and upper teeth 39 pivot downwards towards engagement with the lower teeth 29. When the piston rod of the third jack 45 moves inwards of the cylinder it pulls the tail piece 57 down raising the upper jaw and upper teeth 39 away from the lower teeth 29.

OPERATION OF THE DEVICE

The device is useful in citrus groves to clear groves, uproot undesired trees and to clear paths. A tree is uprooted by sinking the lower teeth 29 under the tree roots and lifting vertically. The tree can then be knocked down and the upper and lower teeth 29, 33, used to encircle the tree trunk and transport the tree. Also the device can be used to clear debris in paths of the grove.

It is to be observed therefore that the present invention provides for a tree loader and remover device mounted on a vehicle front end. One end of an elongated boom is pivotally mounted on said front end and the boom 23 has a jaw plate 35 at the outer end thereof with a lower jaw 27 affixed to the jaw plate. Lower teeth 29 extend outwards from the bottom of said lower jaw 27 while an upper jaw 31 is pivoted to said lower jaw. Upper teeth 33 extend outwards from the upper jaw 31 and a rear tail piece 57 extends to the rear thereof. The device is operated by first, second and third jacks. The first jack 41 is connected between the front end and the boom for raising and lowering the boom. The second jack 43 is connected to the rear of the boom and the jaw plate to pivot the jaw plate with respect to the boom and raise and lower the teeth 29. The third jack 45 is connected between the front of the boom and the rear tail piece 57 to raise and lower the upper teeth 33 with respect to said lower teeth. Both sets of teeth are inwardly bent or crescent shaped so that the two sets of teeth can encircle an object such as a tree trunk.

I claim:

1. A tree remover device comprising:
   a. a vehicle (11) with a front end;
   b. an elongated boom (23) one end of said boom being pivoted to said front end;
   c. a jaw plate (35) pivotally affixed to the other end of said boom, with a lower jaw (27) affixed to said jaw plate (35) and lower teeth (29) extending outwards from the bottom of said lower jaw (27);
   d. an upper jaw (31) pivoted to said lower jaw and upper teeth (33) extending outwards from said upper jaw (31), with a rear tail piece (57) extending to the rear thereof;
   e. first, second and third jacks, said first jack (41) being connected to said front end and said boom (23) for raising and lowering said boom, said second jack (43) being connected to the rear of said boom (23) and said jaw plate (35) to pivot said jaw plate (35) on said boom to raise and lower said lower teeth (29), said third jack (45) being pivoted to the front of said boom and connected to said rear tail piece, said first jack (41) extending parallel to said boom (23), said boom 23 having a pivot piece (47) with a pivot point mounted toward the center thereof, said first jack (41) being coupled to said pivot point.

2. A device as claimed in claim 1, said front end including a front plate, said front plate (19) having side walls (21), said boom comprising first and second arms pivoted to said side walls.

3. A device as claimed in claim 2, said second jack being coupled to said boom at the inner end by a crank lever (53) and at the outer end by a pivoted support (44).

4. A device as claimed in claim 3, said third jack (45) being coupled to said boom by a jack anchor rod (59).

5. A device as claimed in claim 4, said upper and lower teeth and jaws being crescent shaped.

* * * * *